United States Patent
Lee et al.

(10) Patent No.: US 9,670,361 B2
(45) Date of Patent: Jun. 6, 2017

(54) HALOGEN BASED FLAME RETARDANT GLASS FIBER REINFORCED POLYAMIDE RESIN COMPOSITION AND METHOD FOR PREPARING THE SAME

(71) Applicant: LG CHEM, LTD., Seoul (KR)

(72) Inventors: Mi Ah Lee, Daejeon (KR); Sang Rock Lee, Daejeon (KR); Jong Chan Lee, Daejeon (KR); Soo Min Lee, Daejeon (KR); Bong Taek Kang, Daejeon (KR); Jae Kyung Yang, Daejeon (KR)

(73) Assignee: LG CHEM, LTD., Seoul (KR)

(*) Notice: Subject to any disclaimer, the term of this patent is extended or adjusted under 35 U.S.C. 154(b) by 103 days.

(21) Appl. No.: 14/440,298

(22) PCT Filed: Dec. 10, 2014

(86) PCT No.: PCT/KR2014/012115
§ 371 (c)(1),
(2) Date: May 1, 2015

(87) PCT Pub. No.: WO2015/088239
PCT Pub. Date: Jun. 18, 2015

(65) Prior Publication Data
US 2016/0369097 A1    Dec. 22, 2016

(30) Foreign Application Priority Data

Dec. 10, 2013 (KR) .................. 10-2013-0152904
Dec. 8, 2014 (KR) .................. 10-2014-0175078

(51) Int. Cl.
*C08L 77/02* (2006.01)
*C08L 77/06* (2006.01)
*C08L 25/08* (2006.01)

(52) U.S. Cl.
CPC .............. *C08L 77/02* (2013.01); *C08L 77/06* (2013.01); *C08L 25/08* (2013.01); *C08L 2201/02* (2013.01)

(58) Field of Classification Search
CPC ........ C08K 7/14; C08L 77/02; C08L 2201/02
See application file for complete search history.

(56) References Cited

U.S. PATENT DOCUMENTS

| 5,650,466 A | * | 7/1997 | Gottschalk | ........... C08G 69/265 524/514 |
| 5,863,974 A | * | 1/1999 | Tjahjadi | ............... C08K 3/0058 524/412 |
| 6,235,844 B1 | * | 5/2001 | Dadgar | .................... C08F 8/20 525/184 |
| 2008/0290331 A1 | | 11/2008 | Wang | |

FOREIGN PATENT DOCUMENTS

| CN | 1298428 A | 6/2001 |
| CN | 101824115 A | 9/2010 |
| EP | 1060215 A1 | 12/2000 |
| JP | 03200868 A * | 9/1991 |
| JP | 10-273589 A | 1/1998 |
| JP | 2002505365 A | 2/2002 |
| JP | 2008255294 A | 10/2008 |
| KR | 1998-056765 A | 9/1998 |
| KR | 10-2005-0026808 A | 3/2005 |
| KR | 10-2009-0062784 A | 6/2009 |
| KR | 10-2012-0089966 A | 8/2012 |
| KR | 10-2013-0078776 A | 10/2013 |
| WO | 99/45070 A1 | 9/1999 |

OTHER PUBLICATIONS

Machine translation of JP 03200868 A, 1991.*
Denka: "Denka IP Maleimide Type Heat Resistance Modifier," Sep. 2012 [XP055303601]; Retrieved from the Internet: URL:http://www.denka.co.jp/eng/resin/product/pdf/DENKA-IP_En.pdf, on Sep. 19, 2016.

* cited by examiner

*Primary Examiner* — Wenwen Cai
(74) *Attorney, Agent, or Firm* — Dentons US LLP

(57) ABSTRACT

Disclosed are a halogen-based flame retardant glass fiber reinforced polyamide resin composition and a method of preparing the same. A halogen-based flame retardant glass fiber reinforced polyamide resin composition comprising styrene-maleimide based copolymer having a high thermal decomposition temperature to secure flame retardancy and appearance required in electric and electronic components and a method of preparing the same are provided.

7 Claims, No Drawings

HALOGEN BASED FLAME RETARDANT GLASS FIBER REINFORCED POLYAMIDE RESIN COMPOSITION AND METHOD FOR PREPARING THE SAME

This application is a National Stage Entry of International Application No. PCT/KR2014/012115 filed Dec. 10, 2014, which claims priority to and benefit of Korean Application Nos. 10-2013-0152904 filed Dec. 10, 2013 and 10-2014-0175078 filed Dec. 8, 2014, in the Korean Intellectual Property Office, both of which are incorporated herein by reference.

TECHNICAL FIELD

The present invention relates to a halogen-based flame retardant glass fiber reinforced polyamide resin composition and a method of preparing the same. More particularly, the present invention relates to a halogen-based flame retardant glass fiber reinforced polyamide resin composition comprising a styrene-maleimide based copolymer having a high thermal decomposition temperature to secure flame retardancy and appearance required in electric and electronic components, and a method of preparing the same.

BACKGROUND ART

Since polyamide resins as one type of engineering plastic have mechanical strength, wear resistance, thermal resistance, chemical resistance, electrical insulation, arc resistance, and the like, they are used in a variety of applications such as vehicles, electric and electronic components, industrial materials, and the like.

In particular, when used in electric and electronic components, flame retardancy thereof to prevent fire is considered an important property.

Since polyamide resins do not have any inherent flame retardancy, halogen compounds or halogen-free compounds are added thereto or copolymerized therewith, or inorganic compounds or metal hydroxides are added thereto, to provide flame retardancy.

Glass fiber reinforced polyamide materials with a halogen-based flame retardant to improve the flame retardancy must secure appearance characteristics when applied to electric and electronic components. However, when a large amount of flame retardant is used to achieve flame retardancy, flame retardant characteristics may be obtained but gas smudges on a surface may be formed. In addition, mechanical properties such as tensile characteristics and the like are deteriorated, thereby causing a variety of limitations. Therefore, there is an urgent need for development of a halogen-based flame retardant glass fiber reinforced polyamide resin composition to resolve the problems.

DISCLOSURE

Technical Problem

Therefore, the present invention has been made in view of the above problems, and it is one object of the present invention to provide a halogen-based flame retardant glass fiber reinforced polyamide resin composition, which has flame retardancy and superior appearance, for electric and electronic components to secure mechanical properties such as flame retardancy, superior appearance, tensile strength, and the like while avoiding use of a large amount of conventionally added halogen-based flame retardant by using a styrene-maleimide based copolymer having a high thermal decomposition temperature.

Technical Solution

In accordance with one aspect of the present invention, provided is a halogen-based flame retardant glass fiber reinforced polyamide resin composition comprising a styrene-maleimide based copolymer having a thermal decomposition temperature of 300° C. or more, as measured with a thermogravimetric analyzer.

In accordance with another aspect of the present invention, provided is a method of preparing the halogen-based flame retardant glass fiber reinforced polyamide resin, the method comprising twin-screw extruding the halogen-based flame retardant glass fiber reinforced polyamide resin composition at a barrel temperature of 260 to 300° C.

Advantageous Effects

As apparent from the foregoing, when a variety of flame retardants are used as a halogen-based flame retardant glass fiber reinforced polyamide resin composition based on a mixed polyamide resin being an engineering plastic type, superior flame retardant characteristics may be secured. However, by newly comprising a compatibilizer having a high thermal decomposition temperature to supplement gas smudge generation on a surface and mechanical properties such as tensile strength and the like, flame retardancy, superior appearance, and mechanical properties such as tensile strength and the like of electric and electronic components prepared using the same while avoiding use of a large amount of conventionally added halogen-based flame retardant may be secured.

BEST MODE

Hereinafter, the present invention will be described in more detail.

A halogen-based flame retardant glass fiber reinforced polyamide resin composition according to the present invention comprises a styrene-maleimide based copolymer having a high thermal decomposition temperature.

The styrene-maleimide based copolymer having a high thermal decomposition temperature is designed to secure superior appearance characteristics and compatibility between a polyamide resin and a halogen-based flame retardant may be improved.

In one embodiment, a thermal decomposition temperature, which is measured with a thermogravimetric analyzer, of the styrene-maleimide based copolymer may be 300° C. or more, or 300 to 400° C.

For reference, the thermal decomposition degree of a specimen cut into a predetermined size may be measured by elevating temperature from room temperature up to 600° C. at a heating rate of 20° C./min under a nitrogen atmosphere and then up to 800° C. at a heating rate of 20° C./min under an oxygen atmosphere, using a thermogravimetric analyzer (TGA) to thermally decompose.

As a specific embodiment, the styrene-maleimide based copolymer may be a copolymer of 40 to 60 wt % of a styrene based monomer and 60 to 40 wt % of a maleimide based monomer.

In another embodiment, the styrene-maleimide based copolymer may be a copolymer of 40 to 50 wt % of a styrene based monomer and 40 to 59 wt % of a maleimide based monomer, and 1 to 10 wt % of a maleic acid anhydride.

In another embodiment, the styrene-maleimide based copolymer may comprise 40 to 50 wt % of styrene, 40 to 50 wt % of N-phenyl maleimide, and 1 to 10 wt % of a maleic acid anhydride, and may be a terpolymer having a molecular weight of 120,000 to 145,000 g/mol. As commercially available products, MS-L2A manufactured by Adeka and the like having a thermal decomposition temperature 350° C., as measured by TGA, may be used.

In one embodiment, the maleimide based monomer may be at least one selected from methyl maleimide, ethyl maleimide, butyl maleimide, cyclohexyl maleimide, and N-phenyl maleimide.

In one embodiment, the amount of the styrene-maleimide based copolymer may be 0.1 to 10 wt %, 0.1 to 5 wt %, or 0.5 to 5 wt %, based on 100 wt % in total of a polyamide resin constituting the halogen-based flame retardant glass fiber reinforced polyamide resin composition, styrene-maleimide based copolymer, halogen-based flame retardant, and glass fiber.

In one embodiment, as the polyamide resin, cyclic lactam or w-amino acid may be used alone or those formed by polycondensing two or more thereof may be used. In addition, diacids and diamines may be used. Furthermore, homopolyamide, amide, and a mixture thereof may be used.

The polyamide resin may be a crystalline, semicrystalline, or amorphous resin.

As a specific embodiment, the polyamide resin may be at least one first polyamide resin selected from poly hexamethylene diamine adipamide (nylon 6,6), poly hexamethylenediamine sebacamide (nylon 6,10), polyhexamethylene lauramide (nylon 6,12), and poly tetramethylenediamine adipamide (nylon 4,6), at least one second polyamide resin selected from poly caprolactam (nylon 6) and polylaurolactam (nylon 12), or a mixture thereof.

In one embodiment, the amount of the polyamide resin may be 40-85 wt %, 45-60 wt %, or 45-50 wt %, based on 100 wt % in total of a polyamide resin constituting the halogen-based flame retardant glass fiber reinforced polyamide resin composition, styrene-maleimide based copolymer, halogen-based flame retardant, and glass fiber.

As a specific embodiment, in the polyamide resin, at least one first polyamide resin selected from poly hexamethylene diamine adipamide (nylon 6,6), poly hexamethylenediamine sebacamide (nylon 6,10), polyhexamethylene lauramide (nylon 6,12), and poly tetramethylenediamine adipamide (nylon 4,6) and at least one second polyamide resin selected from poly caprolactam (nylon 6) and polylaurolactam (nylon 12) may be mixed in a weight ratio of 0:100 to 100:0, 10:90 to 90:10, or 29:71 to 31:69.

In one embodiment, the halogen-based flame retardant may be a halogen-containing polystyrene based resin. The halogen may be bromine, chlorine, or the like.

As a specific embodiment, the halogen-based flame retardant may be selected from, for example, denatured polystyrene comprising butadiene rubber or a mixture of the denatured polystyrene and a polystyrene resin.

In another embodiment, the halogen-based flame retardant may be a polystyrene based resin comprising 60 to 65 wt % or 61 to 64 wt % of bromine.

In one embodiment, the amount of the halogen-containing polystyrene based resin may be 15 to 40 wt %, or to 25 wt %, based on 100 wt % in total of a polyamide resin constituting the halogen-based flame retardant glass fiber reinforced polyamide resin composition, styrene-maleimide based copolymer, halogen-based flame retardant, and glass fiber.

In one embodiment, the glass fiber may have a diameter of 10 to 20 μm, 10 to 15 μm, or 10 to 13 μm and a length of 1 to 5 mm or 2 to 3 mm.

As a specific embodiment, the glass fiber may be oval glass fiber and may be surface-treated with an amino silane based coupling agent. The amino silane based coupling agent may be used in an amount of 0.5 to 2 wt % or 1 to 1.5 wt % based on 100 wt % of the glass fiber for the surface treatment.

In another embodiment, the glass fiber may have an aspect ratio (L/D) of a length (length of glass fiber, L) to a cross section (cross section of glass fiber, D) of 50 to 300, 200 to 300, 210 to 260, or 215 to 245. Within the range, polymers in the polypropylene resin composition maintain extremely strong binding force and increase rigidity. Accordingly, the glass fiber may substitute for expensive resins and metals when plastic components of vehicles and the like, in which rigidity is highly important, are processed.

The cross section D is a length of the longest side of the cross section when a cross section perpendicularly cut to a longitudinal direction of the glass fiber is a rectangle and a length of the longest diameter of the cross section when the cross section is an oval shape.

In another embodiment, a cross section perpendicularly cut to a longitudinal direction of the glass fiber may be a rectangle or oval shape.

In another embodiment, the shortest side of the glass fiber may be 5 to 15 μm, or 7 to 11 μm when a cross section perpendicularly cut to a longitudinal direction is a rectangle or the shortest diameter of the glass fiber may be 5 to 15 μm, or 7 to 10 μm when a cross section perpendicularly cut to a longitudinal direction is an oval shape.

In one embodiment, the amount of the glass fiber may be 10 to 30 wt %, or 20 to 25 wt %, based on 100 wt % in total of a polyamide resin constituting the halogen-based flame retardant glass fiber reinforced polyamide resin composition, styrene-maleimide based copolymer, halogen-based flame retardant, and glass fiber.

The halogen-based flame retardant glass fiber reinforced polyamide resin composition according to the present invention may comprise one additive or more selected from a lubricant, an antioxidant, a photostabilizer, a chain extender, a catalyst, a release agent, a pigment, a dye, an antistatic agent, an antimicrobial agent, a processing aid, a metal deactivator, a smoke suppressant, inorganic filler, glass fiber, an antifriction agent, an antiwear agent, and a coupling agent. In one embodiment, the additive may be used within a range in which properties of the halogen-based flame retardant glass fiber reinforced polyamide resin composition according to the present invention is not negatively affected.

The halogen-based flame retardant glass fiber reinforced polyamide resin composition according to the present invention is extruded after selectively first mixing with the additive in a mix or a super mix and then melt kneading at 200 to 300° C. or 280 to 300° C. using one of a variety of mixers such as a twin-screw extruder, a single-screw extruder, a roll mill, a kneader, a Banbury mixer, and the like, to obtain a pellet. The resultant pellet is sufficiently dried using a dehumidifying dryer or a hot-air dryer and then injection process, resulting in mass production of the halogen-based flame retardant glass fiber reinforced polyamide resin.

As a specific embodiment, a method of preparing the halogen-based flame retardant glass fiber reinforced polyamide resin may comprise twin-screw extruding the halogen-based flame retardant glass fiber reinforced polyamide resin composition at a barrel temperature of 260 to 300° C. or 280 to 300° C.

According to the present invention, electric and electronic components, which are molded from the halogen-based flame retardant glass fiber reinforced polyamide resin composition, satisfying mechanical characteristics such as superior appearance, moldability, flame retardancy of V-0, tensile strength, flexibility, impact strength, and the like required in electric and electronic components may be provided.

The electric and electronic components may be, for example, injection molded electric and electronic components. As a specific embodiment, the electric and electronic components may be breakers, switches, connectors, or the like.

Now, the present invention will be described in more detail with reference to the following examples. These examples are provided only for illustration of the present invention and should not be construed as limiting the scope and spirit of the present invention.

EXAMPLES

Examples 1 to 8

Ingredients summarized in Table 1 below were added to a super mixer in amounts disclosed in Table 1. The resultant mixture was melt kneaded at a barrel temperature of 280 to 300° C. using a twin-screw extruder and then extruded, resulting in a pellet. The resultant pellet was dried for four hours or more at 80° C. and then injection molded. Subsequently, the pellet was stood at room temperature for one day and then a resultant specimen was used for property evaluation.

Comparative Examples 1 to 4

Specimens were prepared in the same manner as in Example 1 except that ingredients summarized in Table 1 below were used in amounts disclosed in Table 1.

Hereinafter, materials as follows were used in the examples and comparative examples:

(A) Polyamide Resin:
(A-1) Poly hexamethylene diamine adipamide (nylon 6,6)
(A-2) Poly caprolactam (nylon 6)
B) Halogen-Based Flame Retardant:
Polystyrene (brominated polystyrene made in China) containing 60 to 65% of bromine (C) Styrene-Maleimide Based Copolymer:
MS-L2A available from Adeka, having a TGA thermal decomposition measurement value of 350° C. (comprising 47.5 wt % of styrene, 6.2 wt % of a maleic acid anhydride, and 46.3 wt % of N-phenyl maleimide and being a terpolymer having a molecular weight of 135,000 g/mol)

(D) Glass Fiber:
Glass fiber, which is available from Owens Corning, having a diameter of 10 to 13 μm, a length of 3 mm, and an aspect ratio of 50 to 300, and surface-treated with amino silane.

TABLE 1

| Classi-fica-tion | Examples | | | | | | | | Comparative Examples | | | |
|---|---|---|---|---|---|---|---|---|---|---|---|---|
| | 1 | 2 | 3 | 4 | 5 | 6 | 7 | 8 | 1 | 2 | 3 | 4 |
| A-1 | 14.5 | 15 | 14 | 13 | 13.5 | 12 | — | 49.5 | — | 50 | 10 | 10.5 |
| A-2 | 35 | 34 | 33 | 32 | 31.5 | 28 | 49.5 | — | 50 | — | 25 | 24.5 |
| B | 25 | 25 | 25 | 25 | 15 | 40 | 25 | 25 | 25 | 25 | 10 | 25 |
| C | 0.5 | 1 | 3 | 5 | 10 | 10 | 5 | 5 | — | — | 5 | 15 |
| D | 25 | 25 | 25 | 25 | 30 | 10 | 25 | 25 | 25 | 25 | 30 | 25 |

Test Example

Characteristics of specimens prepared from the halogen-based flame retardant glass fiber reinforced polyamide resin compositions prepared according to Examples 1 to 8, and Comparative Examples 1 to 4 were measured as follows. Results are summarized in Table 2 below.

[Property Measurement Test]

Frame retardancy: was measured according to UL94.

Appearance: gas smudges on a surface were observed with the naked eyes. In the table, "5" means a clean state that there is no gas smudge on a surface of a specimen. With decreasing value, gas smudges increase. "1" means a state that gas smudges are observed throughout the entire specimen surface.

Tensile strength: was measured based on ASTM D638.

Flexural strength: was measured based on ASTM D790.

Izod impact strength (specimen thickness is 3.2 mm): was measured based on ASTM D256.

HDT (heat deformation temperature, 18.6 kgf/° C.): was measured based on ASTM D648.

TABLE 2

| Classi-fica-tion | Examples | | | | | | | | Comparative Examples | | | |
|---|---|---|---|---|---|---|---|---|---|---|---|---|
| | 1 | 2 | 3 | 4 | 5 | 6 | 7 | 8 | 1 | 2 | 3 | 4 |
| Frame retardant | V-0 | V-0 | V-0 | V-0 | V-0 | V-0 | V-0 | V-0 | V-2 | V-0 | V-0 | V-0 |
| Appearance | 5 | 5 | 5 | 5 | 5 | 5 | 5 | 5 | 2 | 3 | 2 | 2 |
| Tensile strength (kg/cm$^2$) | 1,340 | 1,340 | 1,380 | 1,400 | 1,600 | 1,150 | 1,480 | 1,460 | 1,480 | 1,450 | 1,590 | 1,450 |
| Flexural strength (kg/cm$^2$) | 103,000 | 101,000 | 103,000 | 103,000 | 101,000 | 70,000 | 107,000 | 102,000 | 105,000 | 102,000 | 107,000 | 105,000 |
| Impact strength (kg·cm/cm) | 6.0 | 6.3 | 6.2 | 6.1 | 10.0 | 5.1 | 6.2 | 6.5 | 6.0 | 6.5 | 9.5 | 6.3 |

TABLE 2-continued

| Classi-fica-tion | Examples | | | | | | | | Comparative Examples | | | |
|---|---|---|---|---|---|---|---|---|---|---|---|---|
| | 1 | 2 | 3 | 4 | 5 | 6 | 7 | 8 | 1 | 2 | 3 | 4 |
| HDT (18.6 kgf/° C.) | 232 | 225 | 221 | 219 | 242 | 220 | 240 | 198 | 244 | 200 | 244 | 217 |

As shown in Table 2, it was confirmed that, in the cases of the specimens prepared from the halogen-based flame retardant glass fiber reinforced polyamide resin compositions according to the present invention (Examples 1 to 8), mechanical characteristics such as superior appearance, moldability, flame retardancy of V-0, tensile strength, flexibility, impact strength, and the like were provided, when compared with the cases in which the styrene-maleimide based copolymer was not used (Comparative Examples 1 to 4).

According to Examples 1 to 6 in which content change of the styrene-maleimide based copolymer was observed in detail, it was investigated that effects were excellent although the styrene-maleimide based copolymer was used in an extremely small amount as in Example 1.

As results, it was investigated that, by adding the styrene-maleimide based copolymer having a high thermal decomposition temperature to a halogen-based flame retardant glass fiber reinforced polyamide resin composition for electric and electronic components having flame retardancy and superior appearance, according to the present invention, a specimen prepared using the same may secure mechanical properties such as flame retardancy and tensile strength and provide improved appearance while avoiding using a large amount of conventionally added halogen-based flame retardant.

What is claimed is:

1. A composition comprising:
    45 to 50 wt % of a polyamide resin, based on 100 wt % in total of the composition;
    0.1 to 10 wt %, of a styrene-maleimide based copolymer, based on 100 wt % in total of the composition, the styrene-maleimide based copolymer comprising 40 to 50 wt % of a styrene monomer, 40 to 50 wt % of a N-phenyl maleimide monomer, and 1 to 10 wt % of a maleic acid anhydride, and the styrene-maleimide based copolymer having a thermal decomposition temperature of 300° C. or more;
    15 to 25 wt % of a halogen-based flame retardant, based on 100 wt % in total of the composition; and
    20 to 25 wt % of a glass fiber, based on 100 wt % in total of the composition,
    wherein the polyamide resin is a mixture of at least one first polyamide resin and at least one second polyamide resin, wherein the at least one first polyamide resin is selected from the group consisting of: poly hexamethylene diamine adipamide (nylon 6,6), poly hexamethylene sebacamide (nylon 6,10), poly hexamethylenediamine lauramide (nylon 6,12), and poly tetra methylenediamine adipamide (nylon 4,6), and wherein the at least one second polyamide resin is selected from the group consisting of: poly caprolactam (nylon 6) and polylaurolactam (nylon 12), wherein a weight ratio of the at least one first polyamide resin to the at least one second polyamide resin is 29:71 to 31:69.

2. The composition according to claim 1, wherein the styrene-maleimide based copolymer is a terpolymer having a molecular weight of 120,000 to 145,000 g/mol.

3. The composition according to claim 1, wherein the halogen-based flame retardant is a halogen-comprising polystyrene based resin.

4. The composition according to claim 1, wherein the halogen-based flame retardant is a polystyrene based resin comprising 60 to 65 wt % of bromine.

5. The composition according to claim 1, wherein the glass fiber is surface-modified with amino silane and has a diameter of 10 to 20 μm, a length of 1 to 5 mm, and an aspect ratio of 50 to 300.

6. The composition according to claim 1, wherein the composition comprises one additive or more selected from the group consisting of a lubricant, an antioxidant, a photostabilizer, a chain extender, a catalyst, a release agent, a pigment, a dye, an antistatic agent, an antimicrobial agent, a processing aid, a metal deactivator, a smoke suppressant, inorganic filler, glass fiber, an antifriction agent, an antiwear agent, and a coupling agent.

7. A molded product comprising the composition according to claim 1.

* * * * *